(12) United States Patent
Glensvig et al.

(10) Patent No.: US 10,815,834 B2
(45) Date of Patent: Oct. 27, 2020

(54) METHOD FOR DETECTING AN UNSEALED LOCATION IN A HEAT RECOVERY SYSTEM

(71) Applicants: AVL LIST GMBH, Graz (AT); FPT INDUSTRIAL S.P.A., Turin (IT); IVECO S.P.A., Turin (IT)

(72) Inventors: Michael Glensvig, Graz (AT); Susanne Mahler, Gratkorn (AT); Markus Thaler, Graz (AT)

(73) Assignees: AVL LIST GMBH, Graz (AT); FPT INDUSTRIAL S.P.A., Turin (IT); IVECO S.P.A., Turin (IT)

( * ) Notice: Subject to any disclaimer, the term of this patent is extended or adjusted under 35 U.S.C. 154(b) by 0 days.

(21) Appl. No.: 16/318,333

(22) PCT Filed: Jul. 12, 2017

(86) PCT No.: PCT/AT2017/060175
§ 371 (c)(1),
(2) Date: Jan. 16, 2019

(87) PCT Pub. No.: WO2018/014058
PCT Pub. Date: Jan. 25, 2018

(65) Prior Publication Data
US 2019/0242274 A1 Aug. 8, 2019

(30) Foreign Application Priority Data

Jul. 18, 2016 (AT) .................................. 50640/2016

(51) Int. Cl.
*F01K 13/00* (2006.01)
*F01K 23/06* (2006.01)
(Continued)

(52) U.S. Cl.
CPC ............ *F01K 13/003* (2013.01); *F01K 21/04* (2013.01); *F01K 23/065* (2013.01);
(Continued)

(58) Field of Classification Search
CPC ...... F01K 13/003; F01K 21/04; F01K 23/065; F01N 2560/021; F01N 3/2066;
(Continued)

(56) References Cited

U.S. PATENT DOCUMENTS 5,369,956 A  12/1994 Daudel et al.
6,526,358 B1  2/2003 Mathews, Jr. et al.
(Continued)

FOREIGN PATENT DOCUMENTS

DE  102011117054 A1  5/2012
JP  2010156314 A  7/2010

*Primary Examiner* — Jesse S Bogue
(74) *Attorney, Agent, or Firm* — Dykema Gossett PLLC

(57) ABSTRACT

The invention relates to a method for detecting an unsealed location in a heat recovery system of an internal combustion engine of a motor vehicle. The heat recovery system has at least one working medium, in particular a combustible working medium, and a working medium circuit with at least one evaporator, a pump, and at least one expansion machine to allow an early and reliable detection of leakages in the evaporator.

10 Claims, 3 Drawing Sheets

(51) Int. Cl.
  *F22B 1/18* (2006.01)
  *F01K 21/04* (2006.01)
  *F01N 3/20* (2006.01)
  *F01N 5/02* (2006.01)
(52) U.S. Cl.
  CPC ............ *F01N 3/2066* (2013.01); *F01N 5/02* (2013.01); *F22B 1/1807* (2013.01); *F01N 2560/021* (2013.01); *F05D 2220/60* (2013.01); *F05D 2260/80* (2013.01); *Y02E 20/363* (2013.01)
(58) Field of Classification Search
  CPC .... F01N 5/02; F05D 2220/60; F05D 2260/80; F22B 1/1807; Y02E 20/363
  See application file for complete search history.

(56) References Cited

U.S. PATENT DOCUMENTS

| | | | | |
|---|---|---|---|---|
| 9,335,004 | B2* | 5/2016 | Abrol | F17D 3/00 |
| 10,066,512 | B2* | 9/2018 | Geskes | F01K 23/065 |
| 10,364,768 | B2* | 7/2019 | Cakallik | F02G 5/02 |
| 2002/0182127 | A1 | 12/2002 | Braun et al. | |
| 2012/0060502 | A1 | 3/2012 | Gartner et al. | |
| 2014/0162199 | A1* | 6/2014 | Abrol | F17D 3/00 |
| | | | | 431/253 |
| 2017/0254227 | A1* | 9/2017 | Guethe | F01K 23/101 |

\* cited by examiner

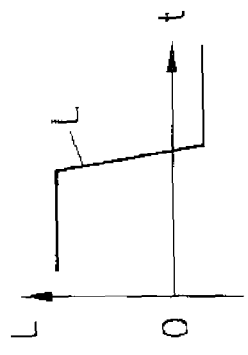
Fig. 2
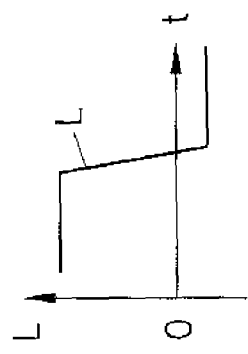
Fig. 3
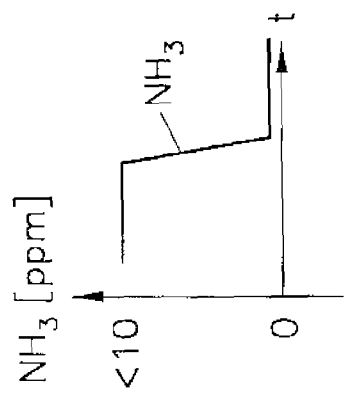
Fig. 4
Fig. 5

METHOD FOR DETECTING AN UNSEALED LOCATION IN A HEAT RECOVERY SYSTEM

CROSS-REFERENCE TO RELATED APPLICATIONS

This application is a national stage filing based upon International PCT Application No. PCT/AT2017/060175, filed 12 Jul. 2017, which claims the benefit of priority to Austria application No. A 50640/2016, filed 18 Jul. 2016.

BACKGROUND

The invention relates to a method for detecting a leaking point in a heat recovery system of an internal combustion engine of a motor vehicle, wherein the heat recovery system has at least one working medium, in particular a combustible working medium, and a working medium circuit having at least one evaporator, a pump and at least one expansion machine, wherein the exhaust gas of the internal combustion engine flows through the evaporator. Furthermore, the invention relates to an internal combustion engine with a heat recovery system which has at least one, in particular combustible, working medium and a working medium circuit with at least one evaporator, a pump and at least one expansion machine, wherein the evaporator is arranged downstream of an SCR catalytic converter in the exhaust gas flow path of the internal combustion engine, for carrying out this method.

When operating a system for heat recovery with a combustible working medium in conjunction with an internal combustion engine and an evaporator, in particular an EGR evaporator (EGR evaporator: EGR=Exhaust Gas Recirculation), the detection of leakages in the system is of high priority. Leakages in a heat recovery system can lead to the following critical scenarios, among others:

Outlet of the working medium into the environment—leads to fire hazard when using a flammable working medium such as ethanol.

Entry of the combustible working medium into the internal combustion engine—causes damage if, for example, the working medium enters the combustion chamber via an EGR evaporator.

Overheating of system components due to insufficient filling level of the working medium—can, for example, lead to overheating of the exhaust gas evaporator if the working medium mass flow rate is too low.

The following methods, for example, are known to detect a leakage in a heat recovery system:

Monitoring of the filling level of the working medium in the expansion tank by means of a filling level sensor. If the filling level is too low, a leakage is indicated.

Leak test by pressurizing the deactivated cold system and then observing the pressure gradient. A too rapid drop in pressure indicates a leakage.

Measuring the electrical conductivity of the insulation of the heat recovery system. A change in conductivity is a sign of leakage.

U.S. Pat. No. 6,526,358 B1, for example, describes a method for detecting leaks and blockages in a fluid circuit, in which pressure, temperature and flow rate are measured and correlated at various points in the circuit.

JP 2010-156314 A discloses a heat recovery system for an internal combustion engine, wherein $O_2$ sensors are arranged in the coolant circuit of the heat recovery system for leakage detection.

Known methods have the disadvantage that they can only be carried out when the vehicle is deactivated and/or that devices such as additional sensors are required.

It is the object of the invention to detect leakages in the evaporator of a heat recovery system early and reliably in the simplest possible way.

SUMMARY OF THE INVENTION

In accordance with the invention, this is achieved by arranging at least one $NH_3$ sensor in the exhaust gas flow path downstream of the evaporator and measuring the exhaust gas—preferably in normal operation of the internal combustion engine—with the aid of the $NH_3$ sensor, wherein if at least one abnormally high $NH_3$ measured value occurs—preferably after a plausibility check has been carried out—a leakage of the evaporator is concluded. The $NH_3$ sensor which is already standard in an SCR catalytic converter is thus placed at a point in the exhaust gas flow path downstream of a possible leakage of the evaporator of the heat recovery system. Leakage is understood to be a defect in tightness, wherein the working medium escapes uncontrolled from the evaporator.

A prerequisite for a statement on the tightness of the heat recovery system is that the $NH_3$ sensor responds to a working medium escaping from the evaporator. To achieve this, a chemical substance is selected as the working medium or a chemical substance is added to the working medium to which the $NH_3$ sensor reacts, wherein the $NH_3$ sensor is preferably cross-sensitive with respect to this substance. In general, cross-sensitivity is generally understood as being the sensitivity of a sensor to quantities other than the quantity to be measured, which can lead to deterioration in the measurement result. In the present case, cross-sensitivity of the $NH_3$ sensor means that it is sensitive to chemical substances other than ammonia. For example, it is known that $NH_3$ sensors have a cross-sensitivity to $NO_x$, especially $NO_2$.

Surprisingly, $NH_3$ sensors have also been shown to be clearly cross-sensitive to other chemical substances such as ethanol, which is usually used as a working medium. The present invention makes use of the fact that $NH_3$ sensors not only react to ammonia, but also to ethanol, for example, in a preferred embodiment variant of the invention. Thus, a leakage of the heat recovery system can be inferred if an abnormally high $NH_3$ measured value is detected. Abnormal in this context means that the detected $NH_3$ measured value is higher than a value that would be permitted by the instantaneous operating point. In order to verify or falsify this, a plausibility check is advantageously carried out with regard to the $NH_3$ measurement value determined. If the evaporator is located downstream of an SCR catalyst, the plausibility check includes whether the increased $NH_3$ reading can be attributed to the injection of an $NH_3$-containing additive.

An SCR catalytic converter (SCR=Selective Catalytic Reduction) in the exhaust gas line of an internal combustion engine serves to reduce nitrogen oxides occurring during combustion. For example, $NH_3$ is required for the reaction, which is added to the exhaust gas upstream of the SCR catalyst in the form of an aqueous urea solution. The products of the reaction are $H_2O$ (water) and $N_2$ (nitrogen). To control the exact dosing of the urea solution, at least one $NH_3$ sensor is usually installed in the exhaust gas line downstream of the SCR catalytic converter. In the context of the present invention, this $NH_3$ sensor is not arranged—as usual—directly after the SCR catalyst or an ammonia barrier catalyst (ASC) possibly downstream of the SCR catalyst, but downstream of an evaporator of the waste heat recovery system arranged after the SCR catalyst or ammonia barrier catalyst. The barrier catalyst is used to reduce or remove optionally excessive $NH_3$ downstream of the SCR storage catalyst 8, wherein ammonia is oxidized to $N_2$ and $H_2O$.

In order to be able to exclude influences of the exhaust aftertreatment on the increased $NH_3$ measured value, a plausibility check must be carried out in normal engine operation of the internal combustion engine if an abnormally high measured value occurs, in accordance with an advantageous embodiment variant, by reducing or stopping the injection quantity of an $NH_3$-containing additive upstream of the SCR storage catalyst—preferably using a closed control circuit—and examining whether, after a defined first waiting time has elapsed, a substantial reduction in the measured $NH_3$ concentration occurs, and, if an abnormally high $NH_3$ measured value is further determined, a leakage of the evaporator is concluded.

As an alternative to or in addition to the leakage investigation in engine operation, it can also be provided in accordance with an advantageous embodiment of the invention that, in the motor-braking operation of the internal combustion engine, the injection of an $NH_3$-containing additive is reduced or stopped upstream of the SCR storage catalytic converter, and it is investigated whether, after a defined second waiting time has elapsed, a substantial reduction in the measured $NH_3$ concentration occurs, and, if an abnormally high $NH_3$ measured value is further determined, a leakage of the evaporator is concluded.

For example, the first and/or second waiting time should be at least 30 to 60 seconds in order to achieve a reaction equilibrium state.

Alternatively or in addition to an evaporator in the exhaust gas line downstream of the SCR catalytic converter, a (further) evaporator of the waste heat recovery system can be arranged in an exhaust gas recirculation line. Here, in most cases, if an abnormally elevated $NH_3$ reading is detected, causes other than evaporator leakage can be excluded.

A leakage of the second evaporator can also be detected—for example in motor-braking operation—by the first $NH_3$ sensor in the exhaust gas line downstream of the first evaporator, provided that the working medium of the working medium circuit escaping at the leakage point of the second evaporator does not enter into a chemical reaction within the combustion chambers or in the exhaust aftertreatment system whose end product can no longer be detected by the $NH_3$ sensor. In order to exclude this risk, it may be provided, in a further development of the invention, that a second $NH_3$ sensor is arranged downstream of the second evaporator in the exhaust gas recirculation line, via which leakages of the second evaporator can be detected directly.

For example, an abnormally high $NH_3$ reading is present if the average $NH_3$ reading is above 10 ppm.

If there is no doubt that the evaporator is leaking, a respective warning signal can be issued to the driver and/or a corresponding entry made in the error code in the on-board diagnostic system.

BRIEF DESCRIPTION OF THE DRAWINGS

The invention is explained in detail below using a non-restrictive embodiment example shown in the drawings, wherein:

FIG. 2 and FIG. 3 show a time curve of the load and the $NH_3$ measured values for a leakage-free heat recovery system; and FIG. 4 and FIG. 5 show a time curve of the load and the $NH_3$ measured values for a leaky heat recovery system when applying the present invention.

DETAILED DESCRIPTION

Figure 1A:
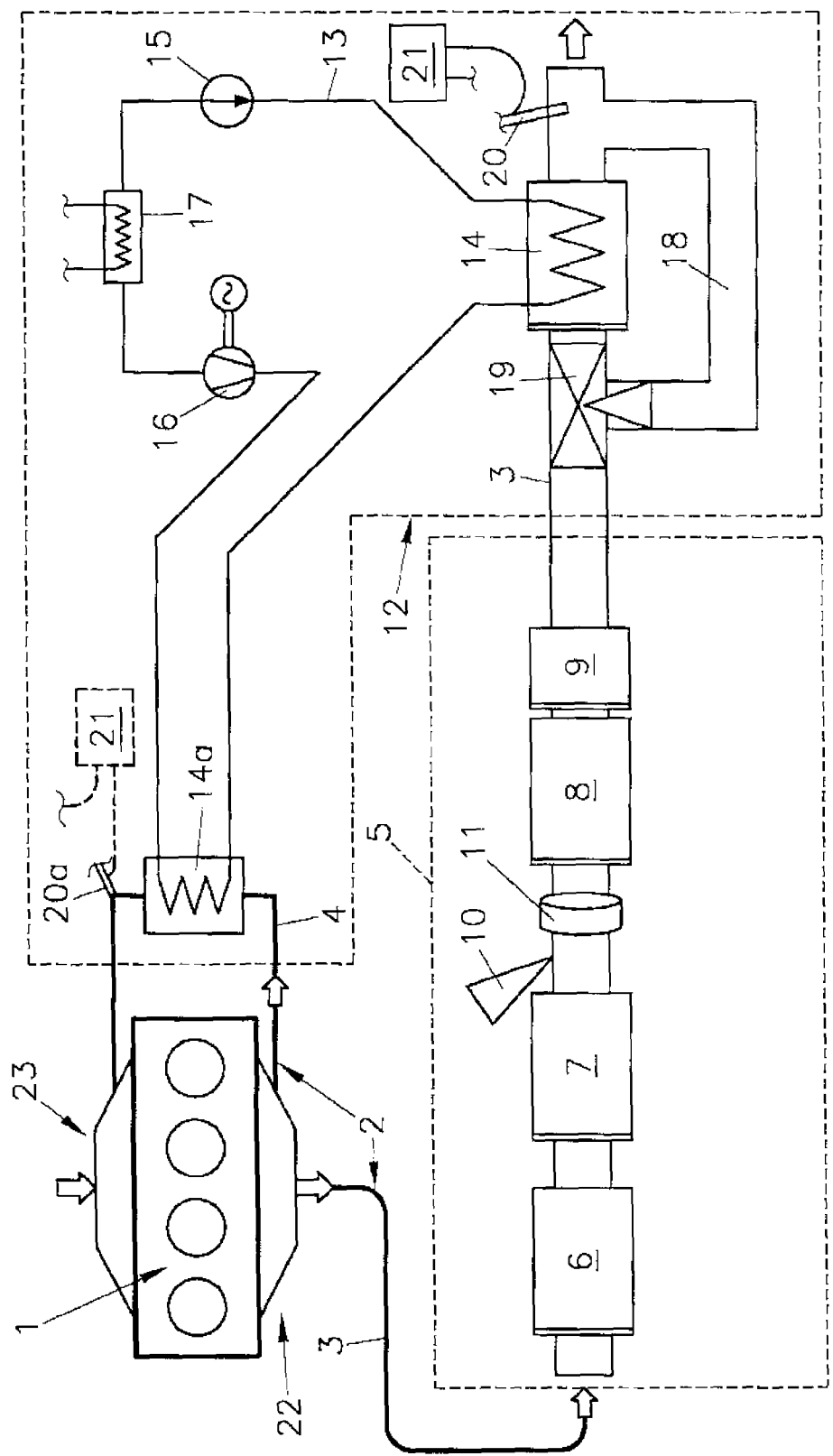
FIG. 1a schematically shows an internal combustion engine according to the invention in a first embodiment variant.
Figure 1B:
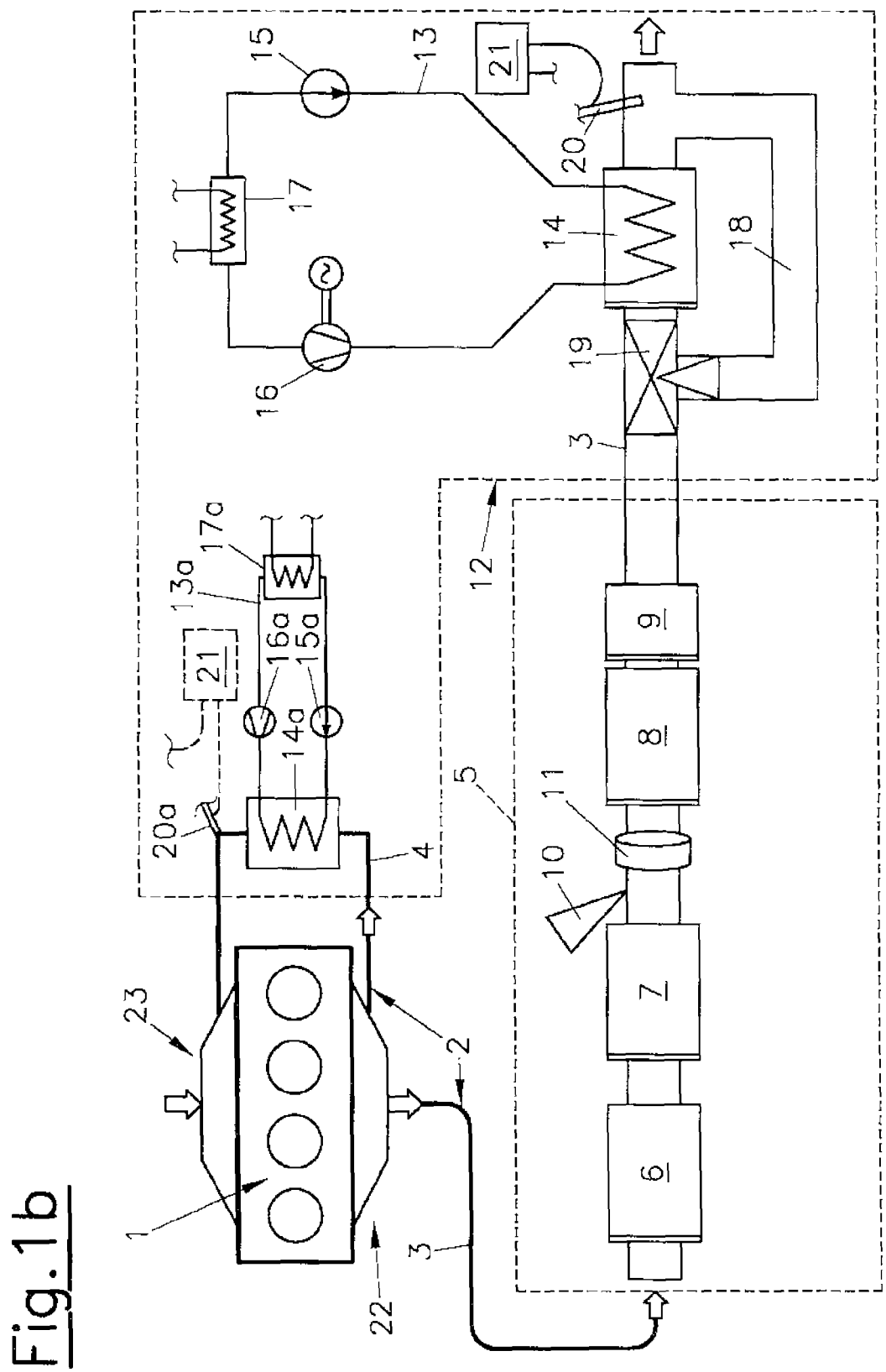
FIG. 1b schematically shows an internal combustion engine according to the invention in a second embodiment variant.

FIG. 1a and FIG. 1b each show an internal combustion engine 1 with exhaust gas flow paths 2, which are formed by an exhaust gas line 3 and an exhaust gas recirculation line 4. The exhaust gas recirculation line 4 is used for external exhaust gas recirculation between exhaust system 22 and intake system 23 of the combustion engine 1.

An exhaust aftertreatment device 5 is arranged in the exhaust gas line 3, which has a diesel oxidation catalytic converter 6, a diesel particulate filter 7, an SCR catalytic converter 8 and a barrier catalytic converter 9 in the embodiment example. An $NH_3$-containing additive can be fed upstream of the SCR catalyst 8 via an injection device 10. A mixer 11 is used to mix and evaporate the injected additive in the exhaust gas stream.

A heat recovery system 12 with a closed working medium circuit 13 for a working medium, for example ethanol, which has at least one first evaporator 14, a pump 15 and at least one expansion machine 16, is provided for recovering the exhaust gas waste heat. Reference numeral 17 denotes a condenser. To bypass the first evaporator 14 on the exhaust side, a bypass line 18 is provided, which branches off from the exhaust gas line 3 upstream of the first evaporator 14 and flows back into the exhaust gas line 3 downstream of the first evaporator 14. Reference numeral 19 denotes a control element formed, for example, by a changeover flap for switching the exhaust gas flow between the flow path through the first evaporator 14 and the bypass line 18.

Optionally, a second evaporator 14a may be provided in the exhaust gas recirculation line 4, which may be integrated upstream or downstream of the first evaporator 14 into the working medium circuit 13 of the heat recovery system 12.

In the first embodiment variant shown in FIG. 1a, the second evaporator 14a is integrated downstream of the first evaporator 14 into the working medium circuit 13. Alternatively, the second evaporator 14a can also be arranged in a second working medium circuit 13a of the heat recovery system 12 comprising a second pump 15a, a second expansion machine 16a and a second condenser 17a, as shown in FIG. 1b.

Downstream of the first evaporator 14, an $NH_3$ sensor 20 is arranged in the exhaust gas line 3. Another $NH_3$ sensor 20a may be located downstream of the second evaporator 20a in the exhaust gas recirculation line 4. The $NH_3$ sensors 20, 20a are connected to a control and/or evaluation unit 21.

The $NH_3$ sensors 20, 20a each have a cross-sensitivity to the working medium—in this case to ethanol—or to a component of the working medium. This means that the $NH_3$ sensors not only detect $NH_3$ measured values from ammonia actually contained in the exhaust gas, but also from the substance initiating the cross-sensitivity. If there is a leakage in the area of evaporator 14 or 14a, this is reflected in the output increased $NH_3$ measured values of the $NH_3$ sensors 20 or 20a.

If an abnormally high $NH_3$ measured value of the first $NH_3$ sensor 20 occurs during normal engine operation of internal combustion engine 1, this $NH_3$ measurement value is subjected to a plausibility check, in that the injection quantity of the $NH_3$-containing additive is reduced or stopped by the injection device 10 upstream of the SCR storage catalyst 8—for example using a closed control loop—by means of the injection device 10, and it is investigated whether a substantial reduction in the measured $NH_3$ concentration occurs after a defined first waiting time (for example 30 to 60 seconds) has elapsed. If an abnormally high $NH_3$ reading continues to be detected, a leakage at the first evaporator 14 may be concluded.

As an alternative to engine operation, the method according to the invention for detecting an unsealed location in the heat recovery system 12 can also be carried out during motor-braking operation or when switching from engine operation to motor-braking operation. During motor-braking operation of internal combustion engine 1, the injection of an $NH_3$-containing additive upstream of the SCR storage catalyst 8 is stopped and it is investigated whether a significant reduction in the measured $NH_3$ concentration occurs after a defined second waiting time of 30 to 60 seconds, for example. If there is no significant reduction in the $NH_3$ measured value, a leakage at the first evaporator 14 can be concluded. If it cannot be ruled out that a working medium possibly escaping from the second evaporator 14a is eliminated or chemically modified in the internal combustion engine 1 or in the exhaust aftertreatment system 5, it is advantageous to use a second $NH_3$ sensor 20a directly downstream of the second evaporator 14a in the exhaust gas recirculation line 4, via which leakages of the second evaporator 14a can be detected directly.

FIG. 2 and FIG. 3 show a time curve of the load L and the $NH_3$ measured values for a leakage-free heat recovery system 12 during a changeover of the internal combustion engine 1 to motor-braking operation. Usually the injection of the $NH_3$ additive is stopped during motor-braking operation. It can clearly be seen that the measured $NH_3$ measured value of the first $NH_3$ sensor 20 decreases drastically—there is therefore no leakage.

FIG. 4 and FIG. 5, on the other hand, show a changeover to motor-braking operation if there is a leakage in the first evaporator 14. In this case there is no reduction in the $NH_3$ measured value. On the contrary—due to the unchanged leakage and the lower gas throughput due to the exhaust gas path in motor-braking operation, there may even be an increase in the $NH_3$ measured value, as the dashed line shows. In this case, a leakage of the evaporator 14 can be clearly identified and a corresponding leakage warning can be issued to the driver.

The main advantage of this invention is that it does not require the use of overly complex leakage detectors. Ideally, an $NH_3$ sensor 14 already fitted as standard in the exhaust gas line—albeit at a point downstream of the evaporator in the exhaust gas flow path 2—can be used to carry out reliable leakage tests.

The invention claimed is:

1. A method for detecting a leak in a heat recovery system of an internal combustion engine of a motor vehicle, wherein the heat recovery system comprises:
    at least one particularly combustible working medium;
    a working medium circuit having at least one evaporator, arranged in an exhaust gas flow path of the internal combustion engine;
    a pump;
    at least one expansion machine;
    wherein at least one $NH_3$ sensor is arranged downstream of the at least one evaporator in the exhaust gas flow path, and configured to measure the exhaust gas, and wherein after the occurrence of at least one abnormally high $NH_3$ measured value a conclusion is drawn on a leakage of the evaporator.

2. The method according to claim 1, wherein a chemical substance serves as a working medium to which the $NH_3$ sensor reacts.

3. The method according to claim 1, wherein a plausibility check is carried out in the engine operation of the internal combustion engine when an abnormally high $NH_3$ measured value is detected, in that the injection quantity of an $NH_3$-containing additive is reduced or stopped upstream of the SCR storage catalytic converter, and checking whether after the expiration of a defined first waiting time, a substantial reduction in the measured $NH_3$ concentration occurs, and if an abnormally high $NH_3$ measured value is still detected, a conclusion is drawn on a leakage of the evaporator.

4. The method according to claim 1, wherein the injection of an $NH_3$-containing additive upstream of the SCR storage catalytic converter is reduced or stopped during the motor-braking operation of the internal combustion engine, and it is examined whether, after the expiration of a defined second waiting period, a substantial reduction in the measured $NH_3$ concentration occurs, and if an abnormally high $NH_3$ measured value is still detected, a conclusion is drawn on a leakage of the evaporator.

5. The method according to claim 1, wherein an abnormally high $NH_3$ measured value is determined when the average $NH_3$ measured value is above 10 ppm.

6. The method according to claim 1, wherein the first and/or second waiting time is at least 30 to 60 seconds.

7. The method according to claim 1, wherein a corresponding warning signal is output when a leakage of the evaporator is detected.

8. The method according to claim 1, wherein a plausibility check is carried out on the measured value before the conclusion is drawn on the leakage of the evaporator.

9. The method according to claim 2, wherein the $NH_3$ sensor has a cross-sensitivity to said chemical substance.

10. The method according to claim 3, wherein the injection quantity of an $NH_3$-containing additive is reduced or stopped upstream of the SCR storage catalytic converter by using a closed control loop.

* * * * *